(12) United States Patent
Kumagai (10) Patent No.: US 10,507,661 B2
(45) Date of Patent: Dec. 17, 2019

(54) METHOD FOR SCHEDULING AND CONTROLLING PRINTER MAINTENANCE

(71) Applicant: SEIKO EPSON CORPORATION, Tokyo (JP)

(72) Inventor: Shiki Kumagai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/173,076

(22) Filed: Oct. 29, 2018

(65) Prior Publication Data

US 2019/0126625 A1    May 2, 2019

(30) Foreign Application Priority Data

Oct. 31, 2017 (JP) .................................. 2017-210107
Apr. 18, 2018 (JP) .................................. 2018-079631

(51) Int. Cl.
| | |
|---|---|
| *G06K 15/02* | (2006.01) |
| *B41J 2/165* | (2006.01) |
| *G06F 3/12* | (2006.01) |
| *B41J 2/045* | (2006.01) |
| *G06K 15/10* | (2006.01) |
| *G06F 11/07* | (2006.01) |

(52) U.S. Cl.
CPC ....... *B41J 2/16579* (2013.01); *B41J 2/04581* (2013.01); *B41J 2/16517* (2013.01); *B41J 2/16535* (2013.01); *G06F 3/1259* (2013.01); *G06F 11/0733* (2013.01); *G06K 15/102* (2013.01); *G06K 15/1857* (2013.01); *G06K 15/1893* (2013.01); *B41J 2002/16582* (2013.01)

(58) Field of Classification Search
CPC ................ B41J 2/16579; B41J 2/04581; B41J 2/16535; B41J 2002/16582; G06K 15/102; G06F 3/1229; G06F 3/1259
See application file for complete search history.

(56) References Cited

U.S. PATENT DOCUMENTS

| | | | |
|---|---|---|---|
| 2007/0109588 A1* | 5/2007 | Saijo | .......................... B41J 3/543 |
| | | | 358/1.14 |
| 2010/0201774 A1* | 8/2010 | Motojima | .................. B41J 3/44 |
| | | | 347/104 |
| 2015/0278649 A1 | 10/2015 | Yoshiwaka et al. | |
| 2015/0343819 A1 | 12/2015 | Groenen et al. | |

FOREIGN PATENT DOCUMENTS

| | | |
|---|---|---|
| JP | 2015-182335 A | 10/2015 |
| JP | 2016-511714 A | 4/2016 |
| WO | WO2014/124836 A | 8/2014 |

* cited by examiner

*Primary Examiner* — Kent Yip
(74) *Attorney, Agent, or Firm* — Workman Nydegger (57) ABSTRACT

A first successive printing job executed for printing a plurality of images in series on a first medium placed alongside a second medium is interrupted after the completion of one printing job for a first image included in the first successive printing job, and before the start of another printing job for printing another image following the first image; a second successive printing job executed for printing a plurality of images in series on the second medium in parallel with the first successive printing job is interrupted after the completion of a printing job included in the second successive printing job and being under execution at a time point at which the first successive printing job has been interrupted; and the maintenance for the printing head is executed in a state in which both the first successive printing job and the second successive printing job is interrupted.

13 Claims, 8 Drawing Sheets

METHOD FOR SCHEDULING AND CONTROLLING PRINTER MAINTENANCE

BACKGROUND

1. Technical Field

The present invention relates to a control method for a liquid ejecting apparatus capable of ejecting liquid from its printing head onto to a plurality of media placed side by side and thereby performing printing of images on each of the media.

2. Related Art

A liquid ejecting apparatus is an apparatus including a liquid ejection head and configured to eject various kinds of liquid from the liquid ejection head. As such a liquid ejecting apparatus, image recording apparatuses, such as an ink jet printer and an ink jet plotter that eject ink, are known. Recently, as these image recording apparatuses, a larger type of image recording apparatus configured to, in a state in which a plurality of media, such as sheets of continuous paper or the like, are placed side by side, perform printing of images on each of the medium by ejecting liquid from a printing head has been proposed (see, for example, JP-A-2015-182335).

In a successive printing job through which a plurality of images are printed in series on a medium, such as a sheet of continuous paper or the like, printing operation is executed over a longer period of time as the increase of the number of images to be printed, and thus, the ejections of liquid are likely to be adversely affected by unfavorable phenomena, such as the adherence of minute liquid droplets, which occur at the time of the ejections of the liquid, to portions in the vicinity of nozzles, the retention of air bubbles in a flow path inside a printing head, and/or the gradually increased viscosity of liquid inside a non-ejection nozzle. In order to prevent the occurrence of such unfavorable phenomena, it is necessary to periodically execute maintenance, such as a cleaning operation and the like, during the execution of the successive printing job. However, in the case where the lengths of images each printed on a corresponding one of a plurality of media, such as that described above, are different from one another, as a result, completion timing points of printing jobs each corresponding to one image vary for each of the media. For this reason, in the case where the maintenance is not executed until the completion timing points of the printing jobs have coincided with one another, the possibility of the occurrence of an ejection failure due to nozzle missing and/or nozzle clogging may be increased. Further, in the case where, at a time point at which a printing job for printing of a given image on one medium among a plurality of media is completed, a successive printing job being under execution on anther medium is interrupted and maintenance is executed, for an image for which printing has been interrupted and then resumed, the thickness and the hue may differ between a portion having been subjected to the printing before the interruption and a portion having been subjected to the printing after the resumption, and as a result, unevenness may arise.

SUMMARY

An advantage of the invention is that a control method for a liquid ejecting apparatus is provided, which enables maintenance to be executed at further appropriate timing in the case where successive printing jobs each associated with a corresponding one of a plurality of media are executed in parallel.

An aspect of the invention is a control method for a liquid ejecting apparatus including a transport mechanism configured to transport a first medium and a second medium in a transport direction in a state in which the first medium and the second medium are placed side by side, a printing head configured to eject liquid onto the first medium and the second medium while the printing head moves in directions intersecting with the transport direction so as to print a plurality of images on the first medium and the second medium, at least one of the plurality of images being different from any other one of the plurality of images in a length in the transport direction, and a maintenance mechanism configured to execute maintenance for the printing head. Further, the control method includes a process in which a first successive printing job for printing a plurality of images in series on the first medium is executed in parallel with a second successive printing job executing a printing of a plurality of images in series on the second medium; a process in which the first successive printing job is interrupted after the completion of one printing job for printing a first image included in the first successive printing job, and before the start of another printing job for printing an image following the first image included in the first successive printing job; a process in which the second successive printing job is interrupted after the completion of a printing job included in the second successive printing job and being under execution at a time point at which the first successive printing job has been interrupted; and a process in which the maintenance for the printing head is executed by the maintenance mechanism in a state in which both the first successive printing job and the second successive printing job are interrupted.

According to this control method, the maintenance is executed at a timing point at which printing jobs included in the first and second successive printing jobs each executed for the first and second media have been completed, and thus, it is possible to not only reduce the occurrence of an ejection failure, but also reduce the occurrence of a defect in which evenness within the images having been printed before and after the execution of the maintenance arises.

In the above control method, preferably, based on printing job data corresponding to each of the first medium and the second medium, time difference from a completion timing point of the printing job for printing the first image on the first medium until at least one completion timing point of the printing jobs executed for the second medium is calculated; the maintenance is executed in the state in which both the first successive printing job and the second successive printing job are interrupted in accordance with an interruption condition that allows the time difference to fall within a predetermined set range.

According to this control method, printing jobs are interrupted in accordance with an interruption condition that allows the time difference from the completion timing point of the printing job executed for the first medium until the completion timing point of the printing job executed for the second medium to fall within the predetermined set range, and thus, the increases of periods of waiting time from the interruptions of the first and second successive printing jobs until the resumptions of the first and second successive printing jobs after the execution of the maintenance are reduced.

Further, in the above control method, preferably, based on printing job data corresponding to each of the first medium and the second medium, time difference from a completion timing point of the printing job for printing the first image on the first medium until at least one completion timing point of the printing jobs executed for the second medium is calculated; the maintenance is executed in the state in which both the first successive printing job and the second successive printing job are interrupted in accordance with an interruption condition that minimizes the time difference.

According to this control method, it is possible to further reduce the periods of waiting time from the interruptions of the first and second successive printing jobs until the resumptions of the first and second successive printing jobs after the execution of the maintenance.

Further, in the above control method, preferably, the time difference is calculated based on completion timing points that are associated with printing jobs included in the first successive printing job and the second successive printing job and that falls within an allowable period that is an allowable range of a period within which the printing is successively executable without the execution of the maintenance; and the maintenance is executed in the state in which both the first successive printing job and the second successive printing job are interrupted in accordance with the interruption condition.

According to this control method, the maintenance is executed within the allowable period, and thus, it is possible to prevent the occurrence of the ejection failure with further certainty.

Further, in the above control method, the liquid ejecting apparatus may further include a detection mechanism configured to detect an ejection failure of the printing head, and a method in which the time difference is calculated when the ejection failure of the printing head is detected by the detection mechanism; and the maintenance is executed in the state in which both the first successive printing job and the second successive printing job are interrupted in accordance with the interruption condition may be employed.

According to this control method, since the maintenance is executed in the case where abnormality in relation to the ejection of the liquid has been detected by the detection mechanism, the execution of unnecessary maintenance is reduced. Thus, the throughput of the printing operation is improved.

Further, in the above control method, preferably, the time difference is calculated within a predetermined period starting from the detection of the ejection failure of the printing head by the detection mechanism; and the maintenance is executed in the state in which both the first successive printing job and the second successive printing job are interrupted in accordance with the interruption condition.

According to this control method, it is possible to not only reduce the increases of periods of waiting time of the first and second successive printing jobs, but also execute the maintenance at an as-early-as-possible state during a period starting from a time point at which the ejection failure has been detected.

Further, in the above control method, preferably, at least one of the first successive printing job and the second successive printing job resumes after the execution of the maintenance.

Another aspect of the invention is a control method for a liquid ejecting apparatus including a transport mechanism configured to transport a first medium and a second medium in a transport direction in a state in which the first medium and a second medium are placed side by side, a printing head configured to eject liquid onto the first medium and the second medium while the printing head moves in directions intersecting with the transport direction so as to print a plurality of images on the first medium and the second medium, at least one of the plurality of images being different from any other one of the plurality of images in a length in the transport direction, and a maintenance mechanism configured to execute maintenance for the printing head. Further, the control method includes a process in which a first successive printing job for printing a plurality of images in series on the first medium is executed in parallel with a second successive printing job executing a printing of a plurality of images in series on the second medium; a process in which the first successive printing job is interrupted after the completion of a printing job for printing a first image included in the first successive printing job and before the start of another printing job for printing an image following the first image; a process in which, in the case where a mid-printing image by executing the second successive printing job at a first time point at which the first successive printing job has been interrupted is a second image having a degree of printing resolution higher than or equal to a degree of printing resolution of the first image, the second successive printing job is interrupted at a second time point at which a printing job for printing the second image has been completed; a process in which, in the case where the mid-printing image by executing the second successive printing job at the first time point is a third image having a degree of printing resolution lower than the degree of printing resolution of the first image, the second successive printing job is interrupted at a midpoint of execution of a printing job for printing of the third image; and a process in which the maintenance for the printing head is executed by the maintenance mechanism in a state in which both the first successive printing job and the second successive printing job are interrupted.

Further, in the above control method, preferably, at least one of the first successive printing job and the second successive printing job resumes after the execution of the maintenance.

According to this control method, when a timing point of the execution of the maintenance has come, in the case where one or more images each having a relatively high degree of printing resolution are included in images that are being printed, the maintenance is executed after one or more printing jobs each associated with a corresponding one of the relevant one or more images have been completed, and thus, it is possible to not only reduce the occurrence of the ejection failure, but also reduce the occurrence of a defect in which evenness arises among images for which higher image quality is required.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments to practice the invention will be described with reference to the accompanying drawings. It should be noted that, in embodiments described below, various limitations to show preferred specific examples of the invention are given, but the scope of the invention is not limited to the embodiments below unless there is any particular comment stating the limitation of the invention in the description below. Further, in the following description of embodiments according to the invention, as a liquid ejecting apparatus according to the invention, an ink jet printer 1 (hereinafter referred to as a printer), namely, an ink jet printer mounting an ink jet printing head (hereinafter referred to as a printing head) that is one kind of liquid ejecting head, will be exemplified.

Figure 1:
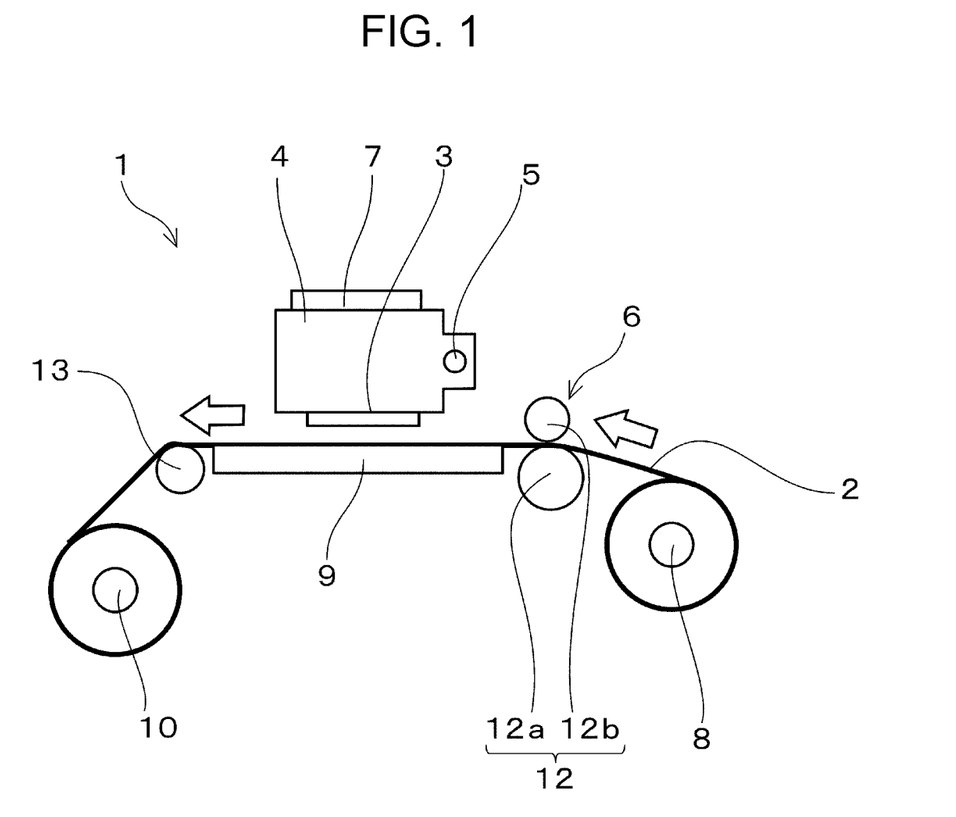
FIG. 1 is a side view of one embodiment of a liquid ejecting apparatus (printer), illustrating a configuration of the one embodiment of the liquid ejecting apparatus.
Figure 2:
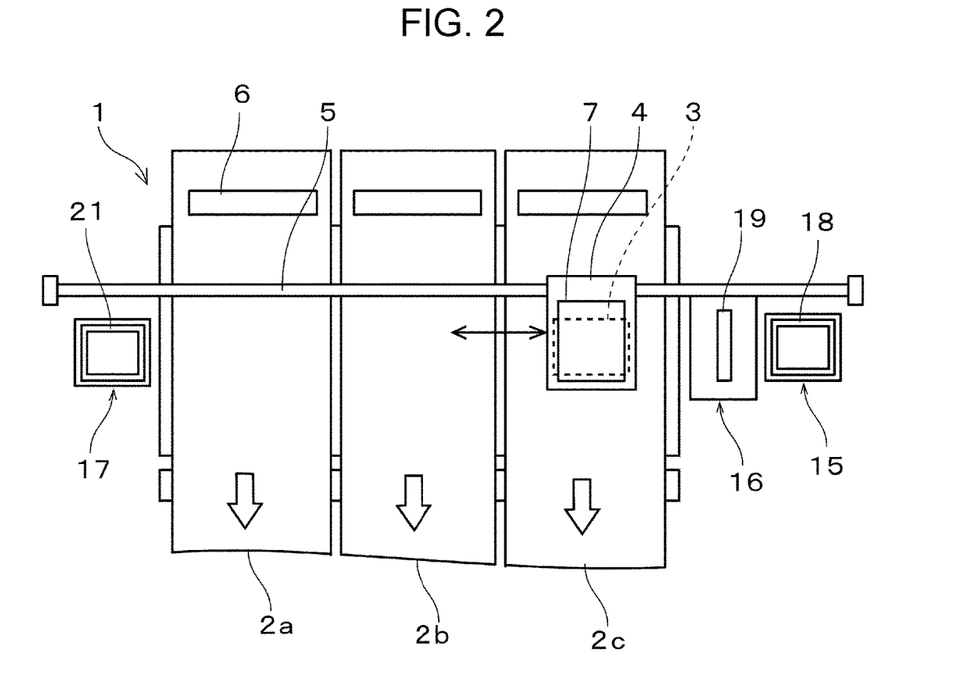
FIG. 2 is a plan view of the one embodiment of the liquid ejecting apparatus, illustrating a configuration of the one embodiment of the liquid ejecting apparatus.

FIGS. 1 and 2 are diagrams each illustrating the configuration of one embodiment of the printer 1 in the present embodiment of the invention, FIG. 1 being a side view of the printer 1, illustrating an internal configuration of the printer 1, FIG. 2 being a plan view of the printer 1, illustrating an internal configuration of the printer 1. The printer 1 in the present embodiment is an apparatus that performs printing (recording) of images or the like by ejecting ink in a liquid state onto the surfaces of printing media 2 (one kind of medium in the invention). The printer 1 includes a printing head 3, a carriage 4, a guide rod 5, a transport mechanism 6, a carriage movement mechanism 11, and the like. Here, the printing head 3 is attached to the carriage 4; the guide rod 5 pivotally supports the carriage 4; the transport mechanism 6 transports the printing media 2 in a sub-scanning direction (a transport direction, namely, the direction of each of arrows in FIGS. 1 and 2); and the carriage movement mechanism 11 (see FIG. 3) moves the carriage 4 in a width-direction of the printing medium 2 (a main-scanning direction intersecting with the sub-scanning direction). The printing media 2 in the present embodiment is one kind of medium made of recording paper (continuous paper), cloth, resin film, or the like, and is kept in a state of being wounded in a roll shape around an unreeling shaft 8. Further, the printing media 2 are configured to move on a platen 9 by the driving of the transport mechanism 6, the platen 9 being disposed so as to be spaced from a lower face (a nozzle face) of the printing head 3, and are further configured to be wounded around a reeling shaft 10 after having been subjected to printing of images by the printing head 3. The printer 1 according to the present embodiment of the invention is configured to be capable of performing printing of images on each of the printing media 2 using the printing head 3 while transporting the plurality of ("three" in the present embodiment) printing media 2 (2a to 2c) in a state in which the plurality of printing media 2 are placed side by side in a lateral direction, that is, a movement direction of the printing head 3 (the main-scanning direction).

The guide rod 5 is internally installed across the both sides of the printer 1 along a direction orthogonal to the sub-scanning direction. The carriage 4 reciprocates in the main-scanning direction (the width-direction of the printing media 2) by the driving of a pulse motor (not illustrated), such as a DC motor or the like, while being guided by the guide rod 5. The transport mechanism 6 includes a paper feed roller 12 and a transport roller 13. The paper feed roller 12 is constituted by a pair of a roller 12a and a roller 12b. The roller 12a and the roller 12b are respectively located at an upper position and a lower position, and are synchronously rotatable in mutually opposite directions in a state of pinching the printing media 2. The paper feed roller 12 supplies the printing media 2 to the side of the printing head 3 by being driven by power from a paper feed motor (not illustrated). The paper feed roller 12 in the present embodiment is configured to be capable of transporting the plurality of printing media 2 on a medium-by-medium basis. The transport roller 13 is disposed on the side opposite the paper feed roller 12 so as to interpose the platen 9 between the paper feed roller 12 and the relevant transport roller 13. Further, the transport roller 13 guides the post-printing printing media 2 toward the side of the winding shaft 10.

As the kind of the above ink, various kinds of ink, such as aqueous ink, solvent ink, and the like, can be used. Such ink is stored in the inside of an ink cartridge 7, namely, an ink cartridge serving as a liquid supply source. Further, the ink cartridge 7 is attachably/detachably attached to the carriage 4 (the printing head 3). Here, a configuration in which the ink cartridge 7 is disposed on the side of the body of the printer 1 and the ink is supplied from the ink cartridge 7 to the printing head 3 via an ink supply tube can be employed.

As illustrated in FIG. 2, a home position, namely, the waiting position of the printing head 3, is set at a position deviated to one end side in the main-scanning direction relative to the platen 9 (namely, at the right-hand side in FIG. 2). Further, a capping mechanism 15 and a wiping mechanism 16 are provided at the home position in series from the one end side. Further, a flushing box 17, namely, a flushing box serving as a flushing area, is provided at the other end portion in the main-scanning direction (namely, at the left-hand side in FIG. 2) so as to interpose the platen 9 between the home position and the relevant flushing box 17. The capping mechanism 15 includes a cap 18, namely, a cap made of an elastic member, such as elastomer or the like, and is configured to be capable of transiting to a state in which the cap 18 seals the nozzle face (a nozzle plate 30) of the printing head 3 as the result of bringing the cap 18 into contact with the nozzle face (namely, a capping state) or a waiting state in which the cap 18 is isolated from the nozzle face. Further, a cleaning operation that is one kind of maintenance operation and that allows ink with increased viscosity, air bubbles, and the like to be ejected together with ink from nozzles 34 of the printing head 3 into the inside of the cap is performed by allowing an unillustrated negatively pressurizing mechanism, such as a suction pump or the like, to negatively pressurize (suck) a space inside the cap in a state in which the nozzle face is capped.

The wiping mechanism 16 is a mechanism for performing wiping operation that is one kind of maintenance operation and that allows a wiper 19 to wipe the nozzle face of the printing head 3. The wiping mechanism 16 in the present embodiment is configured to be capable of transiting to a state in which the wiper 19 is in contact with the nozzle face or a waiting state in which the wiper 19 is isolated from the nozzle face. As the wiper 19, one of variously configured wipers can be employed, and the wiper 19 is constituted by, for example, a wiper including an elastic blade whose body is covered with cloth. In the present embodiment, the wiper 19 performs wiping while sliding on the nozzle face in such a way that the printing head 3 moves in the main-scanning direction in a state in which the wiper 19 is in contact with the nozzle face. Here, a configuration in which the nozzle face is wiped in such a way that the wiper 19 travels by itself in a state in which the printing head 3 halts its movement can be also employed. In short, any configuration in which the nozzle face is wiped in a way that allows the printing head 3 and the wiper 19 to be relatively moved is applicable. These capping mechanism 15 and wiping mechanism 16 function as a maintenance mechanism 20. The above flushing box 17 includes a tray-shaped ink receptacle portion 21, namely, an ink receptacle portion for receiving ink having been ejected at the time of the flushing operation that, separately from the printing on the printing media 2, forcibly causes the ink to be ejected from the nozzles 34 of the printing head 3. The position of this ink receptacle portion 21 is fixed.

Figure 3:
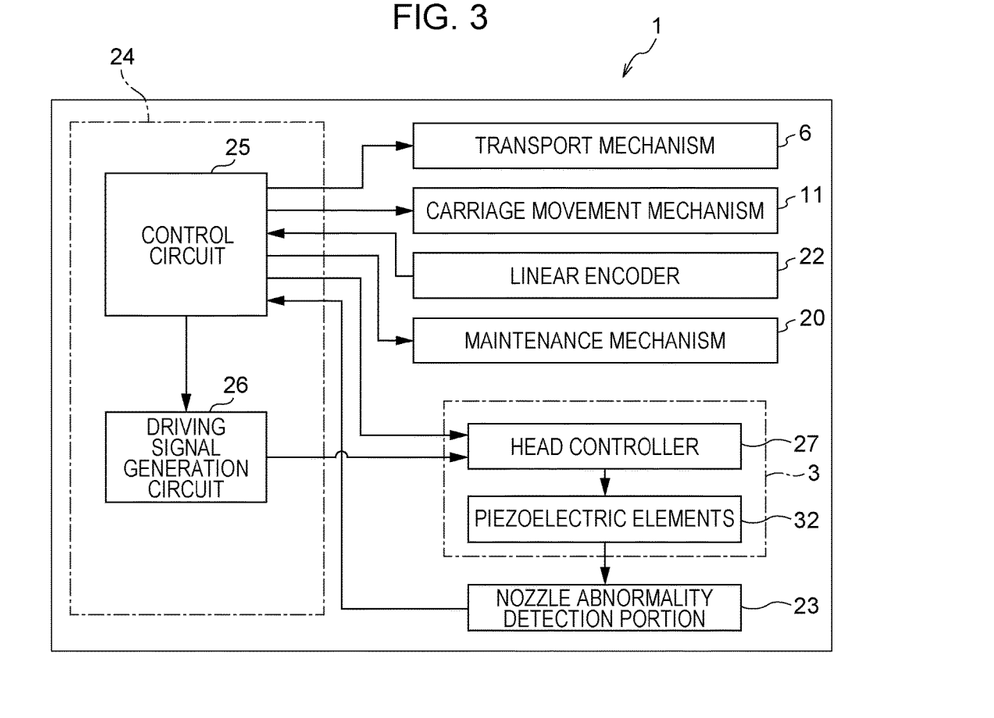
FIG. 3 is a block diagram illustrating an electric configuration of the one embodiment of the liquid ejecting apparatus.

FIG. 3 is a block diagram illustrating an electric configuration of the printer 1. The printer 1 in the present embodiment includes the transport mechanism 6, the carriage movement mechanism 11, a linear encoder 22, the printing head 3, and a nozzle abnormality detection portion 23 (one kind of detection mechanism in the invention), and a printer controller 24, namely, a printer controller for controlling these components.

The printer controller 24 in the present embodiment includes a control circuit 25, a driving signal generation circuit 26, and the like. The control circuit 25 is an arithmetic processing device for controlling the whole of the printer, and is constituted by a CPU, a storage device, and the like, these components being not illustrated. The control circuit 25 controls each of units in accordance with programs stored in the storage device, and the like. Further, the control circuit 25 in the present embodiment generates ejection data indicating which size of an ink droplet (a liquid droplet) is to be ejected through each of the nozzles 34 of the printing head 3 (see FIG. 4) at which timing (onto which of the printing media 2) at the time of the execution of printing operation, on the basis of printing data (printing job data) having been received from an external device or the like, and transmits the generated ejection data to a head controller 27 of the printing head 3.

Further, the control circuit 25 generates timing signals (timing pulses) from encoder signals (encoder pulses) that, as described later, are output from the linear encoder 22 in conjunction with the movement (the main scanning) of the carriage 4. The driving signal generation circuit 26 outputs a driving signal COM every time each of the timing signals is received. The driving signal generation circuit 26 generates an analog voltage signal on the basis of waveform data in relation to the waveform of the driving signal, and amplifies the voltage signal using an unillustrated amplification circuit to generate the driving signal COM. The driving signal COM having been generated by the driving signal generation circuit 26 is transmitted to the head controller 27 of the printing head 3.

The carriage movement mechanism 11 includes a driving motor (for example, a DC motor) or the like (which is not illustrated) that causes the carriage 4 to travel via a timing belt or the like to thereby cause the printing head 3 mounted in the carriage 4 to move along the guide rod 5 in the main-scanning direction. As described above, the transport mechanism 6 performs the sub-scanning by sequentially feeding out the printing media 2 (2a to 2c) onto the platen 9. Further, the linear encoder 22 outputs encoder signals each associated with a corresponding one of scanning positions of the printing head 3 mounted in the carriage 4, to the control circuit 25 of the printer controller 24, as position information in the main-scanning direction. The control circuit 25 is capable of grasping a scanning position (a current position) of the printing head 3 on the basis of the encoder signals having been received from the side of the linear encoder 22.

The nozzle abnormality detection portion 23 is a mechanism for detecting an ejection failure of each of the nozzles 34 of the printing head 3. The nozzle abnormality defection portion 23 performs verification testing to verify whether or not, for each of the nozzles 34, the ejection of ink is normally carried out during the printing operation. The nozzle defect detector 23 in the present embodiment is configured to output an electromotive force signal (a detection signal) for each of piezoelectric elements 32 (described later) to the control circuit 25, the electromotive force signal being based on a vibration that occurs in ink inside a corresponding pressure chamber 35 when the each piezoelectric element 32 is driven at the time of the ejection of the ink. The control circuit 25 determines the presence or absence of abnormality in relation to the ejection of ink through the each nozzle 34 on the basis of the electromotive force signal output from the nozzle abnormality detector 23. In abnormal cases, such as a case of nozzle missing, namely, a defect in which no ink is ejected through a nozzle 34, or a case in which, even though ink is ejected through a nozzle 34, the amount and the flight speed (the initial speed) of the ink ejected through the nozzle 34 are significantly reduced, compared with those of a normal nozzle 34, the cycle element and the amplitude element of the above detection signal are different, compared with a vibration cycle (a reference vibration cycle) and an amplitude in a normal case, which are obtained in advance. The detection of the ejection abnormality based on the electromotive force signal is commonly known, and thus, the detailed description thereof is omitted here, but the above detection method enables the detection of the ejection abnormality (the nozzle missing) due to the ink with increased viscosity and/or the air bubbles. Note that, as the detection method for the nozzle missing, without being limited to the exemplified detection method using back electromotive force, one of various commonly-known methods, such as a method in which ink droplets ejected through each of the nozzles 34 are optically detected, and the like, can be employed.

The printer 1 configured in the way described above performs printing of images or the like on the printing media 2 by causing ink (ink droplets), which is one kind of liquid, to be ejected onto the printing media 2 through the nozzles 34 (see FIG. 4) of the printing head 3 so as to cause the ink to be landed on the printing media 2, while causing the transport mechanism 6 to sequentially transport the printing media 2, and causing the printing head 3 to relatively move in the main-scanning direction relative to the printing media 2.

Figure 4:
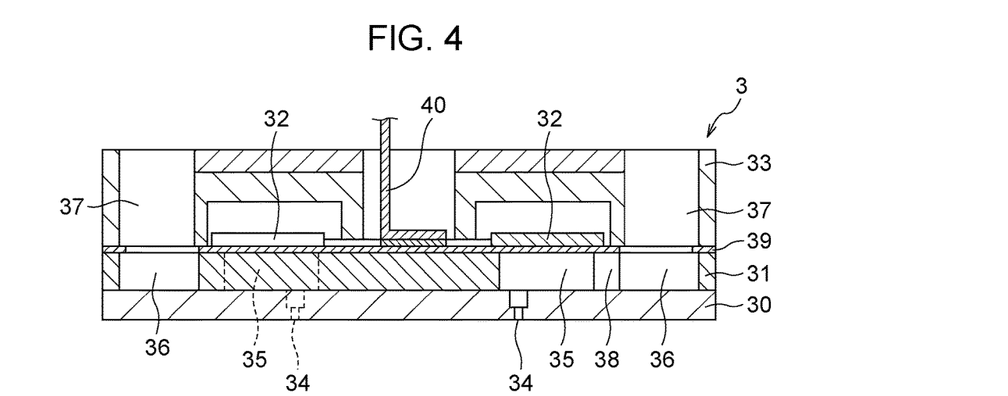
FIG. 4 is a cross-sectional view of one embodiment of a printing head illustrating a configuration of the one embodiment of the printing head.

FIG. 4 is a main portion cross-sectional view of the printing head 3, illustrating an internal configuration of the printing head 3. The printing head 3 in the present embodiment is configured to stack the nozzle plate 30, a flow path substrate 31, the piezoelectric elements 32, a case 33, and the like. The nozzle plate 30 is a plate-shaped member in which the plurality of nozzles 34 each forming an opening at a pitch corresponding to a dot forming density are provided so as to form rows, and is manufactured from, for example, a silicon single crystal substrate or a metal plate made of stainless or the like. In the present embodiment, two nozzle rows (nozzle sets) each constituted by a plurality of nozzles 34 are placed in the nozzle plate 30. The nozzle rows in the present embodiment are constituted by the nozzles 34 whose total number is, for example, four hundreds.

A plurality of the pressure chambers 35 are formed in the flow path substrate 31 in such a way that each of the pressure chambers 35 is associated with a corresponding one of the nozzles 34 of the nozzle plate 30. Further, a common liquid chamber 36 is formed outside of each of rows of the pressure chambers 35 in the flow path substrate 31. The common liquid chamber 36 separately communicates with each of the pressure chambers 35 via a supply inlet 38. Further, ink from the side of the ink cartridge 7 is introduced to the common liquid chamber 36 via an introduction flow path 37 of the case 33. The piezoelectric elements 32 (one kind of pressure generation portion) are formed on the upper face of the flow path substrate 31 via an elastic film 39, the upper face being located on the opposite side of the flow path substrate 31 from the side of the nozzle plate 30.

Each of the piezoelectric elements 32 is formed by sequentially stacking a lower electrode film made of metal, a piezoelectric material made of, for example, lead zirconate titanate or the like, and an upper electrode film made of metal (these constituent elements being not illustrated). The each piezoelectric element 32 is a so-called bending mode piezoelectric element, and is formed so as to cover the upper portion of a corresponding pressure chamber 35. In the present embodiment, two rows of piezoelectric elements are placed in such a way that each of the two rows of the piezoelectric elements is associated with a corresponding one of the two rows of nozzles. Further, a wiring substrate 40 is electrically connected to a terminal portion of each of the piezoelectric elements 32, and the wiring substrate 40 constitutes one portion of a signal path, and is a chip on film (COF) that is one kind of wiring member, or the like. The wiring substrate 40 applies the driving signal COM sent from the driving signal generation circuit 26, to a corresponding piezoelectric element 32. In the present embodiment, the head controller (see FIG. 3) is provided on the wiring substrate 40, but without being limited to this configuration, a configuration in which the head controller 27 is disposed on a different substrate, and functions as an interposer can be also employed. The driving signal COM having been sent from the side of the driving signal generation circuit 26 via the wiring substrate 40 is selectively applied to a corresponding each piezoelectric element 32 by the head controller 27 on the basis of the ejection data having been sent from the control circuit 25. Upon apply of a driving pulse included in the driving signal COM to a piezoelectric element 32, the piezoelectric element 32 is deformed in accordance with a voltage waveform of the driving pulse. With this deformation of the piezoelectric element 32, a pressure variation occurs in the ink inside a pressure chamber 35 corresponding to the piezoelectric element 32, and the ink is ejected through a corresponding nozzle 34 by the pressure variation of the ink. Note that the configuration of the printing head 3 is not limited to the above exemplified configuration, and one of commonly known and variously configured printing heads can be employed.

Next, the operation of the printer 1 according to the present embodiment of the invention will be described. In the following, a case where mutually different images or the like are printed on the respective three printing media 2a to 2c by the printing head 3 while the printing media 2a to 2c are sequentially transported in a state in which, as illustrated in FIG. 2, the printing media 2a to 2c are arranged in the main-scanning direction will be described. Upon receipt of printing job data, the control circuit 25 analyzes the printing job data to generate ejection data for each of scanning operations on the respective printing media 2a to 2c, and outputs the generated ejection data to the head controller 27. Further, in the printing head 3, based on the ejection data having been received from the control circuit 25, control for applying the driving signal COM, which is generated by the driving signal generation circuit 26, to each of the piezoelectric elements 32 is performed, and in response the applied driving signal COM, ink is ejected through a corresponding nozzle 34. In this way, the printing operation of printing images or the like on each of the printing media 2a to 2c is performed. In the following, one operation of printing one image will be referred to as a printing job. Further, in the case where a plurality of images are sequentially and successively printed on the basis of the printing job data, a series of printing operations each associated with a corresponding one of the plurality of images will be referred to as a successive printing job.

Here, in a successive printing job through which a plurality of images are printed on a corresponding printing medium 2, the printing operations are executed over a longer period of time as the number of images to be printed increases, and thus, the ejections of ink are likely to be adversely affected by unfavorable phenomena, such as the adherence of minute ink droplets, which occur at the time of the ejections of the ink, to portions in the vicinity of the nozzles 34 of the nozzle plate 30; the retention of air bubbles in the flow path inside the printing head 3, and/or the gradually increased viscosity of ink inside a non-ejection nozzle 34, namely, a nozzle through which no ink is ejected. In order to prevent the occurrence of such unfavorable phenomena, it is necessary to periodically execute maintenance, such as a cleaning operation and the like, during the execution of the successive printing job. However, in the case where printing operations are performed in parallel on the plurality of printing media 2, when the sub-scanning direction length of at least one of a plurality of images printed on the plurality of printing media 2 is different from the sub-scanning direction length of any other one of the plurality of images, as a result, the completion timing points of the printing jobs differ for each of the plurality of printing media 2. For this reason, in the case where the maintenance is not executed until the completion timing points of the printing jobs have coincided with one another, the possibility that nozzle missing and nozzle clogging occur and an ejection failure is caused thereby may be increased. Further, in the case where, at a time point at which a printing job for a given image on one medium 2 among the plurality of media 2 has been completed, printing of a mid-printing image in a successive printing job being under execution on another printing medium 2 is interrupted and further maintenance is executed, for an image for which printing has been interrupted and then resumed, the thickness and the hue may differ between a portion having been subjected to the printing before the interruption and a portion having been subjected to the printing after the resumption. The printer 1 according to the present embodiment of the invention is configured to, in order to prevent the occurrence of such a defect, interrupt the successive printing jobs at further appropriate timing and then execute the maintenance.

Figure 5:
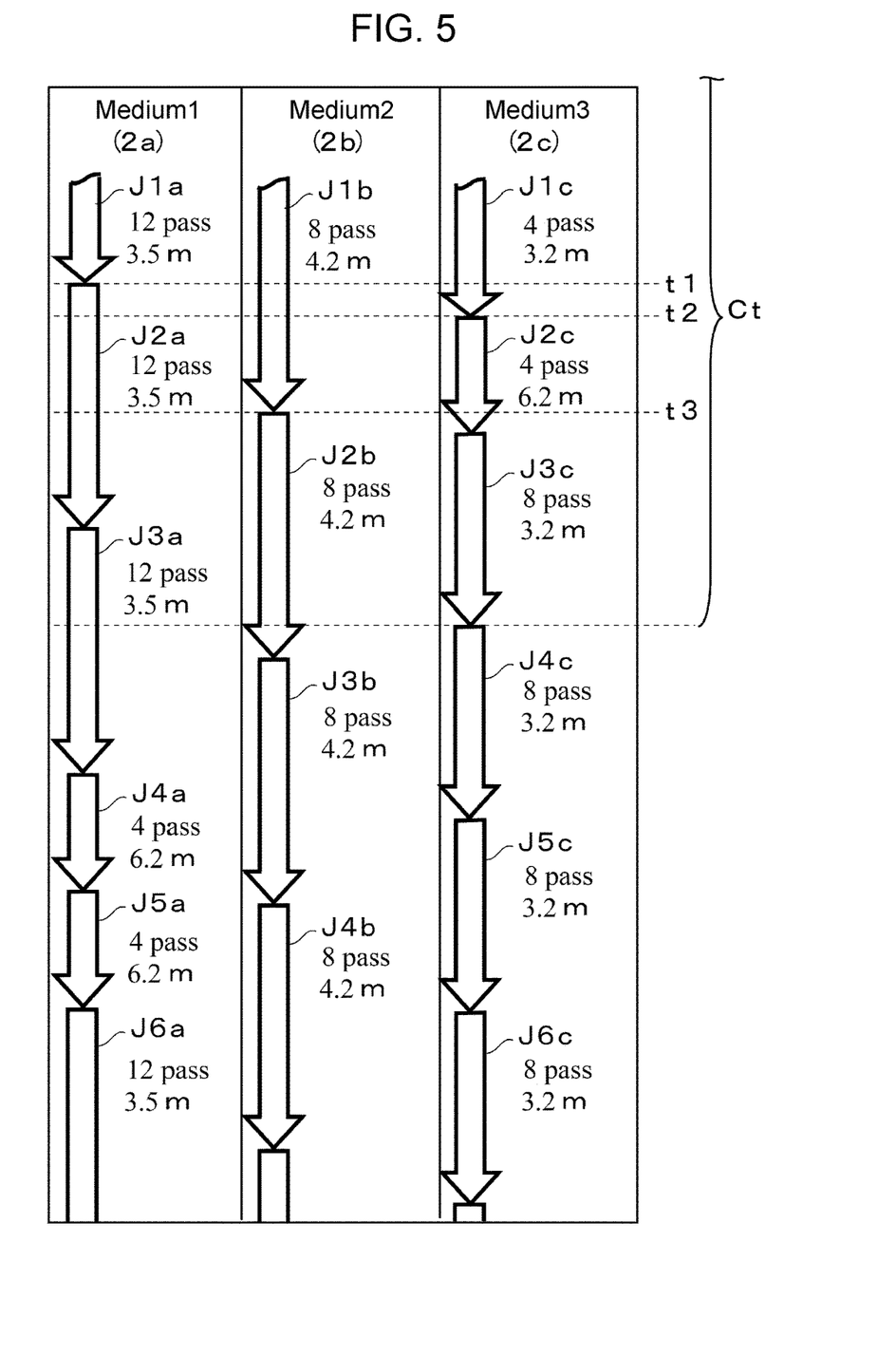
FIG. 5 is a timing chart of successive printing jobs each executed for a corresponding one of printing media.
Figure 6:
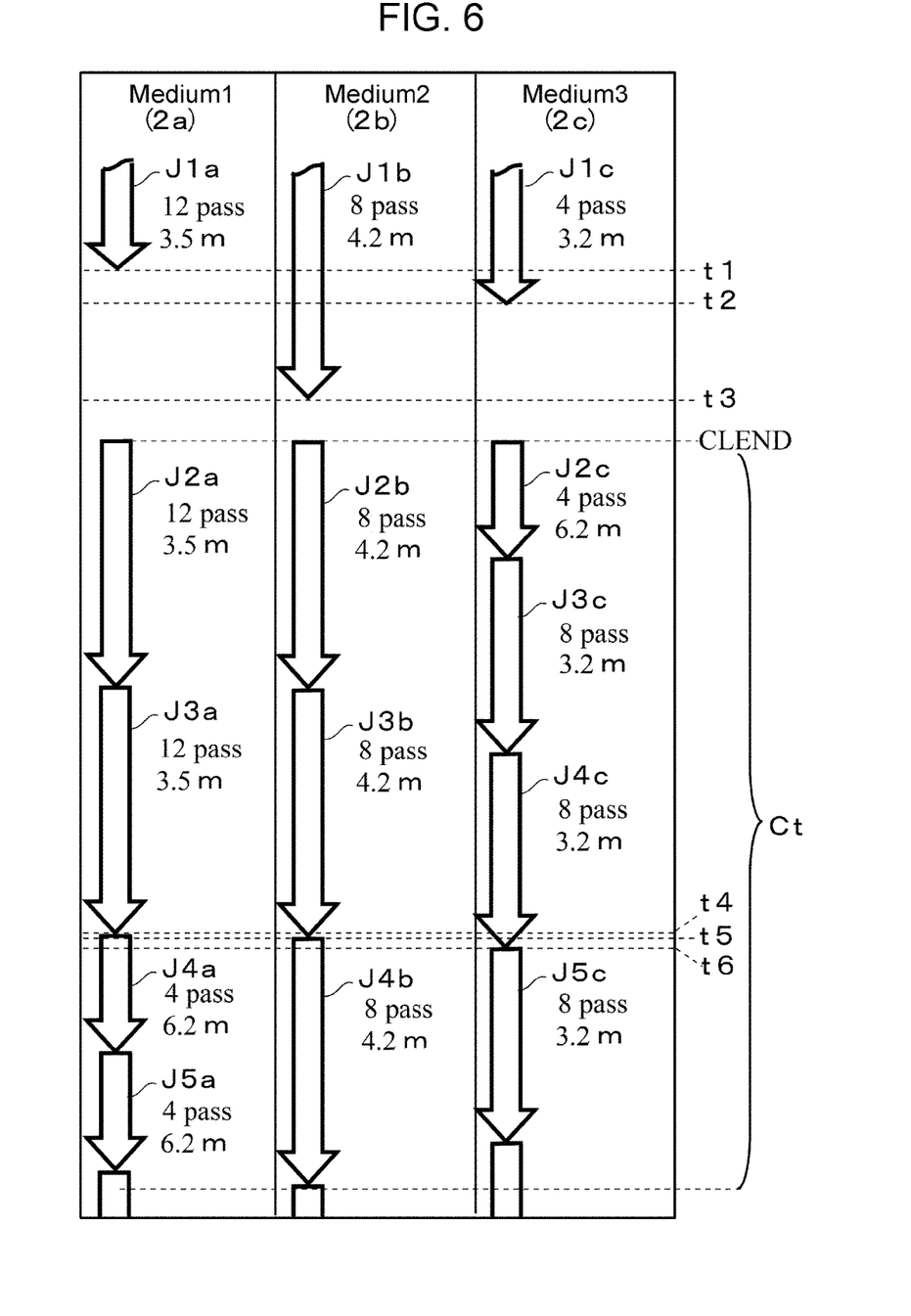
FIG. 6 is another timing chart of the successive printing jobs each executed for a corresponding one of the printing media.
Figure 7:
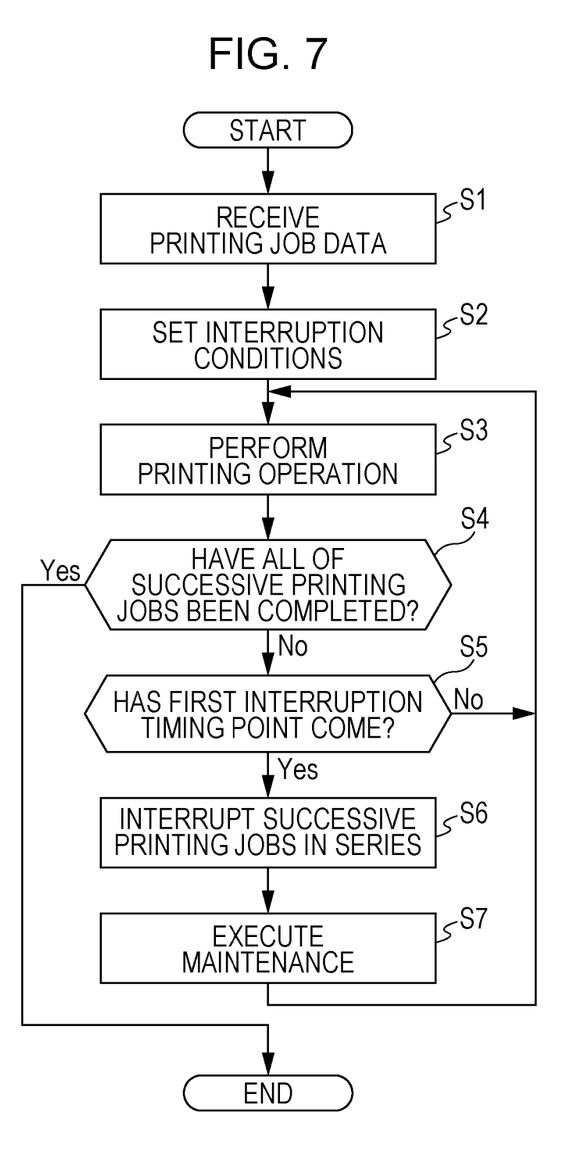
FIG. 7 is a flowchart illustrating the flow of processes in the printing operation of the liquid ejecting apparatus.

FIG. 5 and FIG. 6 are diagrams each illustrating a timing chart of the successive printing jobs each executed for a corresponding one of the printing media 2a to 2c, and FIG. 5 and FIG. 6 respectively illustrate a timing chart before the execution of maintenance (before the interruptions of the successive printing jobs) and a timing chart after the execution of the maintenance (after the resumptions of the successive printing jobs). Further, FIG. 7 is a flowchart illustrating a flow of processes in the printing operation of the printer 1. Here, in FIGS. 5 and 6, the length of a necessary period of time for each printing job is represented by an arrow whose length is proportional to the length of the necessary period of time for the each printing job. Further, in FIGS. 5 and 6, a range denoted by Ct indicates an allowable period that is an allowable range of a period within which printing is successively executable without the execution of maintenance. That is, in the case where the printing is successively performed over the allowable period Ct, a defect (an ejection failure) more easily occurs, and thus, it is preferable that the maintenance is executed at least once within the allowable period Ct. Here, the larger the number of passes (the number of the scanning operations of the printing head 3) relative to a predetermined transport-direction length of each image is, the higher a degree of resolution of the each image is. A number followed by "pass" in FIGS. 5 and 6 indicates the number of scanning operations of the printing head 3 when an image within a given range is printed. For example, among individual images in the example of the present embodiment, an image for which the number of passes, each being a unit of a scanning operation of the printing head 3 when an image within a given range is printed, is represented by "12 pass" is a high resolution image having the highest degree of printing resolution in the example. Similarly, among the individual images, an image for which the number of passes when an image within a given range is printed is represented by "8 pass" is an image whose printing resolution is a middle degree of resolution in the example, and an image for which the number of passes when an image within a given range is printed is represented by "4 pass" is a low resolution image having the lowest printing resolution in the example. Note that the number of passes for each degree of resolution is not limited to the exemplified numbers, and is set in accordance with a specification or the like for a printer (a liquid ejecting apparatus). As illustrated in FIGS. 5 and 6, the degrees of printing resolution and the sub-scanning direction lengths of the respective images to be printed on the printing media 2a to 2c are not always the same. Thus, in the individual successive printing jobs, the completion timing points of the printing jobs are not always the same. In such a case, in the printer 1 according to the present embodiment of the invention, as described below, the maintenance is executed during the printing operations (during the executions of the successive printing jobs).

As illustrated in FIG. 7, upon receipt of printing job data from an external device or the like (step S1), the control circuit 25 sets interruption conditions related to the successive printing jobs and allowing the maintenance to be executed during the executions of the successive printing jobs, on the basis of the printing job data (step S2). More specifically, time difference from a completion time point (a completion timing point) associated with one printing job executed for one printing medium 2 among the printing media 2a to 2c until completion time points each associated with a corresponding one of printing jobs of the other printing media 2 is calculated, and interruption conditions that allow the time difference to fall within a predetermined set range are set. Further, in the present embodiment, the above time difference is calculated in such a way that the maintenance is executed at least once within the above allowable period Ct on the basis of printing job data falling within a range corresponding to the allowable period Ct, that is, on the basis of completion timing points each of which is associated with a corresponding one of printing jobs included in the respective successive printing jobs and which fall within a range corresponding to the allowable period Ct. For example, as illustrated in FIG. 5, on the assumption that, among the successive printing jobs executed for the respective printing media 2a to 2c, a successive printing job executed for the first printing medium 2a (Medium 1) is interrupted first at a completion time point t1 of a printing job J1a, time difference from the completion time point t1 of the printing job J1a until a completion time point t2 of a printing job J1c executed for the third printing medium 2c (Medium 3), the printing job J1c being under execution (being ongoing) at the completion time point t1, is calculated, and similarly, time difference from the completion time point t1 of the printing job J1a until a completion time point t3 of a printing job J1b executed for the second printing medium 2b (Medium 2), the printing job J1b being also under execution at the completion time point t1, is calculated.

Here, among the above completion time points of the respective printing jobs, a period of time from the time point t1, at which the printing job J1a executed for the first printing medium 2a is interrupted first, until the time point t3, at which the printing job J1b executed for the second printing medium 2b is interrupted last, can be obtained by calculating (t3−t1). Further, next, a period of time from the time point t2, at which the printing job J1c executed for the third printing medium 2c is interrupted, until the time point t3, at which the printing job J1b executed for the second printing medium 2b is interrupted last, can be obtained by calculating (t3−t2). In the case where, like the present embodiment, three or more successive printing jobs that are performed in parallel on the printing media 2 are interrupted, it is preferable that periods of waiting time for the respective successive printing jobs are shorter. For this reason, when setting the interruption conditions, as time difference Δt, total time difference between a last interruption time point and the other individual interruption time points, that is, Δt=(t3−t1)+(t3−t2) in the case of the example of FIG. 5, is calculated, and it is determined whether or not this calculated value falls within a predetermined set range. Through this method, even in the case where, for example, a value of (t3−t1) is the same, the smaller a value of (t3−t2) is, the smaller a value of the time difference Δt is. Further, in the case where the calculated time difference Δt falls within a set range, interruption conditions that cause each of the successive printing jobs to be interrupted at a corresponding one of the time points t1 to t3 are set. In the present embodiment, interruption conditions that minimize the time difference Δt within the allowable period Ct are set. Through the setting of such interruption conditions, periods of waiting time from the interruptions of the successive printing jobs executed for the respective printing media 2a to 2c until the resumptions of the successive printing jobs after the execution of maintenance are reduced as much as possible.

Note that, as illustrated in FIG. 6, in the case where, the individual successive printing jobs are further performed during a period that is longer than the allowable period Ct and that starts from a time point (CLEND) at which the individual successive printing jobs are resumed subsequently to the completion of the maintenance, the time difference is calculated again on the basis of printing job data falling within a range starting from the relevant time point and corresponding to the allowable period Ct, and then, interruption conditions are set. In an example of FIG.

6, within the allowable period Ct, a time point t4, namely, a time point at which a printing job J3a executed for the first printing medium 2a is interrupted, a time point t5, namely, a time point at which a printing job J3b executed for the second printing medium 2b is interrupted, and a time point t6, namely, a time point at which a printing job J4c executed for the third printing medium 2c is interrupted, minimize the time difference Δt, and interruption conditions that cause each of the successive printing jobs to be interrupted at a corresponding one of the time points t4 to t6 are set. Note that, in the case where, before the completions of all of the successive printing jobs executed for the respective printing media 2, successive printing jobs executed for part of the printing media 2 are completed, the time difference is calculated on the basis of printing job data corresponding to printing media 2 that remain thereafter, and interruption conditions are set. Further, in the case where a successive printing job is performed on only a single printing medium 2, the successive printing job is interrupted at a time point when any printing job within the allowable period Ct has been completed, and the maintenance is executed.

When the interruption conditions have been set in the way described above, the printing operations executed for the respective printing media 2a to 2c, that is, the successive printing jobs, are stared (step S3).

Subsequently, it is determined whether or not all of the successive printing jobs executed for the respective printing media 2a to 2c have been completed (step S4). Here, in the case where it has been determined that all of the successive printing jobs executed for the respective printing media 2a to 2c have been completed (Yes), the series of the printing operations are completed. In contrast, in the case where it has been determined that all of the successive printing jobs executed for the respective printing media 2a to 2c have not yet been completed (No), subsequently, it is determined whether or not a first interruption timing point in the preset interruption conditions has come (step S5). That is, in the example of FIG. 5, it is determined whether or not the completion time point t1 of the printing job J1a executed for the first printing medium 2a has come, wherein the completion time point t1 is a time point at which a relevant successive printing job is interrupted first in the interruption conditions. Further, in the case where it has been determined that the first interruption timing point in the interruption conditions has not yet come (No), the process flow returns to step S3, and the printing operations, that is, the successive printing jobs executed for the respective printing media 2a to 2c, are continued. In contrast, it has been determined that the first interruption timing point in the interruption timing points has come (Yes), the successive printing jobs executed for the respective printing media 2a to 2c are interrupted in series under the preset interruption conditions (step S6). That is, in the example of FIG. 5, the successive printing job (the first successive printing job) executed for the first printing medium 2a (corresponding to one medium and the first medium) is interrupted at a time point (the time point t1), that is, after the completion of the printing job J1a executed for the first printing medium 2a and before the start of a next printing job J2a executed for the first printing medium 2a. Similarly, the successive printing job (the second successive printing job) executed for the third printing medium 2c (corresponding to at least one remaining medium and the second medium) is interrupted at a time point (the time point t2), that is, after the completion of the printing job J1c executed for the third printing medium 2c and before the start of a next printing job J2c executed for the third printing medium 2c. Finally, the successive printing job (the second successive printing job) executed for the second printing medium 2b (corresponding to at least one remaining medium and the second medium) is interrupted at a time point (the time point t3), that is, after the completion of the printing job J1b executed for the second printing medium 2b and before the start of a next printing job J2b executed for the second printing medium 2b.

Upon interruption of all of the successive printing jobs executed for the respective printing media 2a to 2c under the preset interruption conditions, the maintenance (for example, the cleaning operation) is executed (step S7). That is, the cleaning operation that is one kind of maintenance operation and that causes the ink as well as the ink with increased viscosity, the air bubbles, and the like, to be ejected into the inside of the cap 18 from each of the nozzles 34 of the printing head 3 is performed in such a way that the carriage 4 is moved to the home position by the carriage movement mechanism 11 and the space inside the cap 18 is negatively pressurized (sucked) in a state in which the nozzle face of the printing head 3 is capped by the capping mechanism 15. Further, after the execution of the maintenance, the process flow returns to step S3, and the successive printing jobs executed for the respective printing media 2 are resumed. That is, in the example of FIG. 6, the individual successive printing jobs are resumed from the printing job J2a executed for the first printing medium 2a, the printing job J2b executed for the second printing medium 2b, and the printing job J2c executed for the third printing medium 2c.

In this way, in the case where successive printing jobs are executed in parallel on the respective plurality of printing media 2, one successive printing job executed for one medium 2 is interrupted after the completion of one printing job included in the one successive printing job and conducting printing of one image and before the start of another printing job included in the one successive printing job and conducting printing of another image following the one image; successive printing jobs each executed for a corresponding one of remaining media 2 in parallel with the one successive printing job executed for the one medium 2 are interrupted after the completions of printing jobs each included in a corresponding one of the successive printing jobs and being under execution at a time point at which the one successive printing job executed for the one medium 2 has been interrupted; the maintenance for the printing head 3 is executed by the maintenance mechanism in a state in which these successive printing jobs are interrupted; and the successive printing jobs executed for the respective printing media 2 are resumed after the execution of the maintenance. That is, the maintenance is executed at a timing point after the completions of printing jobs each included in a corresponding one of the successive printing executed for the respective plurality of printing media 2, and thus, it is possible to not only reduce the occurrence of the defect in which the evenness between images having been printed before and after the execution of the maintenance arises, but also reduce the occurrence of the ejection failure.

Further, in the present embodiment, the maintenance is executed within the allowable period Ct, and thus, it is possible to prevent the occurrence of the ejection failure with further certainty. Moreover, the interruption conditions are set in such a way that the time difference from a completion timing point of one printing job executed for one printing medium 2 among the printing media 2a to 2c until the completion timing points of printing jobs each executed for a corresponding one of the remaining printing media 2 falls within a predetermined set range. Thus, the increases of periods of waiting time from the interruptions of the successive printing jobs each executed for the respective printing media 2a to 2c until the resumptions of the successive printing jobs after the execution of the maintenance are reduced. Further, it is possible to further reduce the periods of waiting time by setting interruption conditions in such a way as to minimize the above time difference.

Note that, in the above embodiment, namely, a first embodiment of the invention, the configuration in which the time difference is calculated on the basis of the printing job data falling within a range corresponding to the allowable period Ct, and then the interruption conditions are set is exemplified, but without being limited to this configuration, for example, in the case where all of the successive printing jobs executed for the respective printing media 2 are completed within the allowable period Ct, a configuration in which the time difference is calculated on the basis of printing job data corresponding to the entire period of each of the successive printing jobs, and the interruption conditions are set may be employed.

Figure 8:
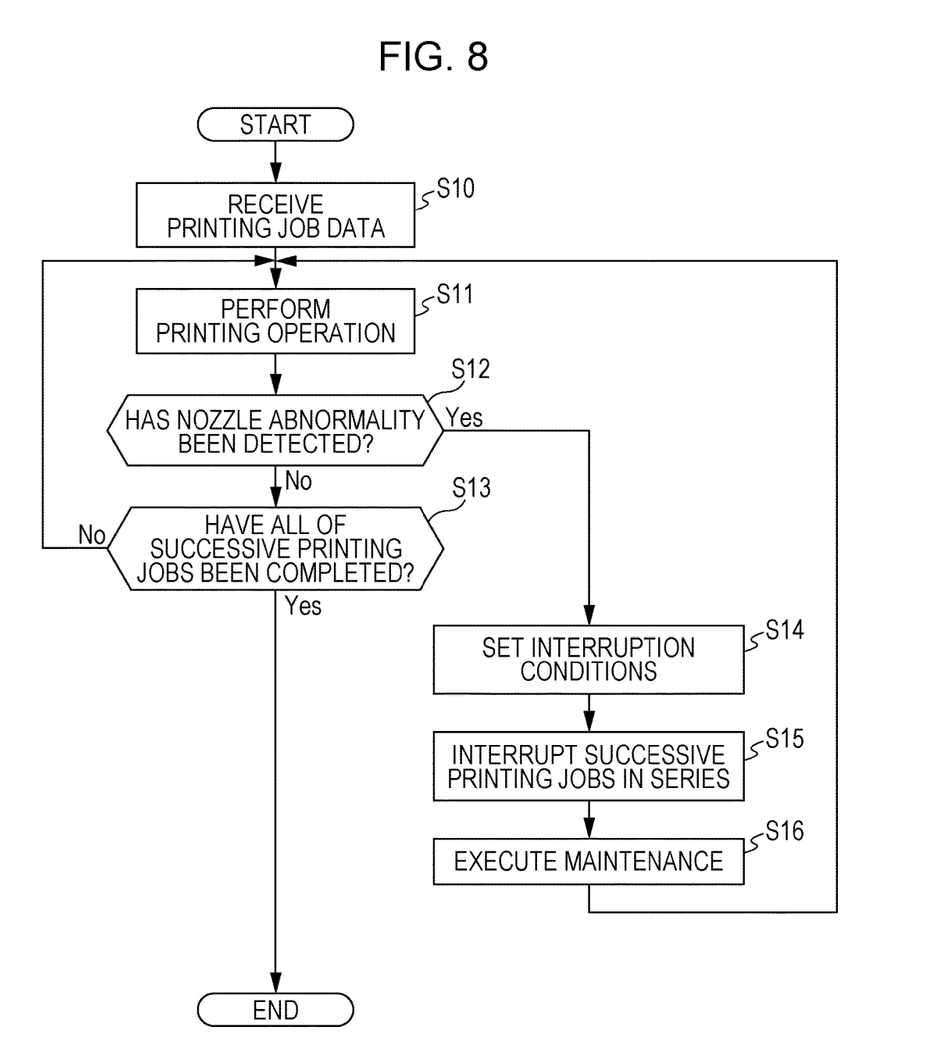
FIG. 8 is a flowchart illustrating the flow of processes in printing operation in a second embodiment.

FIG. 8 is a flowchart illustrating the flow of processes in the printing operation of the printer 1 in a second embodiment of the invention. The present embodiment is different from the first embodiment described above in that, in the case where abnormality in relation to the ejection of ink through a nozzle 34 has been detected at a certain time point by the nozzle abnormality detection portion 23, the above time difference is calculated on the basis of printing job data beginning from the relevant time point, and interruption conditions are set. That is, upon receipt of printing job data from an external device or the like (step S10), the printing operations performed on the respective printing media 2a to 2c, that is, the successive printing jobs, are started (step S11). The control circuit 25 monitors the nozzle abnormality detection portion 23 during the execution of the printing operations, and thereby determines whether or not nozzle abnormality has been detected, on the basis of the detection signals from the nozzle abnormality detection portion 23 (step S12). In the case where it has been detected that the nozzle abnormality has not been detected (No), subsequently, it is determined whether or not all of the successive printing jobs executed for the respective printing media 2a to 2c have been completed (step S13). In the case where it has been determined that all of the successive printing jobs executed for the respective printing media 2a to 2c have been completed (Yes), the series of the printing operations are completed. In contrast, in the case where it has been determined that all of the successive printing jobs executed for the respective printing media 2a to 2c have not yet completed (No), the process flow returns to step S11, and the printing operations are continued.

In the case where it has been determined in step S12 that the nozzle abnormality has been detected (Yes), interruption conditions for the successive printing jobs are set (step S14). That is, similarly to the first embodiment, time difference from a completion timing point of one printing job executed for one printing medium 2 among the printing media 2a to 2c until completion timing points of printing jobs each executed for a corresponding one of remaining printing media 2 is calculated, and interruption conditions are set in such a way that the calculated time difference falls within a predetermined set range. At this time, it is preferable that the time difference is calculated on the basis of printing job data corresponding to a predetermined period starting from the time point at which the nozzle abnormality has been detected. With this configuration, it is possible to not only reduce the increases of the periods of waiting time for the successive printing jobs executed for the respective printing media 2a to 2c, but also execute the maintenance at an as-early-as-possible stage during a period starting from the time point at which the nozzle abnormality has been detected. Further, the successive printing jobs executed for the respective printing media 2a to 2c are interrupted in series under the interruption conditions having been set above (step S15), and subsequently, the maintenance is executed (step S16). After the execution of the maintenance, the process flow returns to step S11, and the successive printing jobs executed for the respective printing media 2 are resumed. In the present embodiment, in the case where abnormality in relation to the ejection of ink through a nozzle 34 has been detected at a detection time point by the nozzle abnormality detection portion 23, the maintenance is executed after the above time difference has been calculated on the basis of printing job data beginning from the detection time point, and the interruption conditions have been set, and thus, the execution of unnecessary maintenance is reduced. Thus, the throughput of the printing operation is increased.

Figure 9:
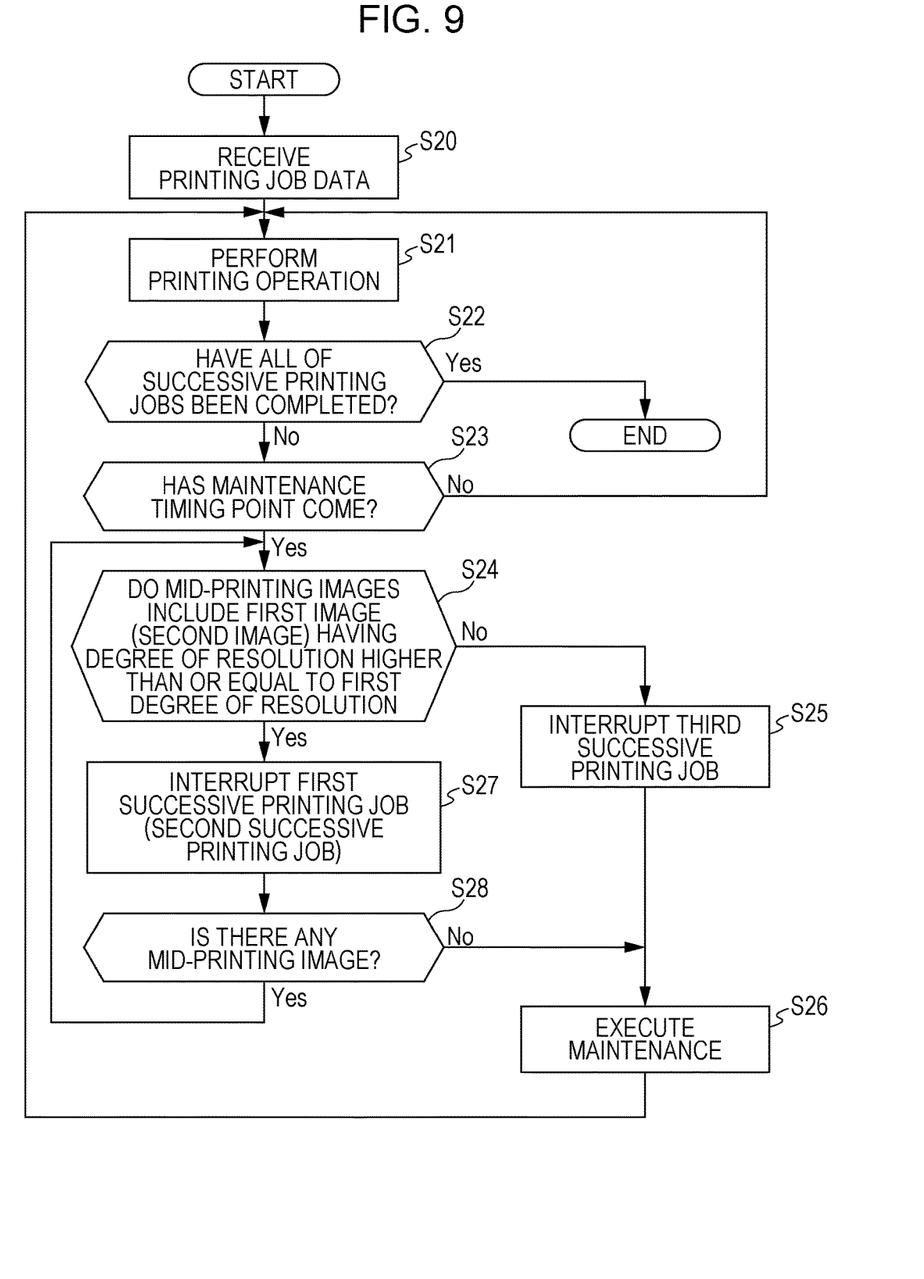
FIG. 9 is a flowchart illustrating the flow of processes in printing operation in a third embodiment.

FIG. 9 is a flowchart illustrating the flow of processes in the printing operation of the printer 1 in a third embodiment of the invention. The present embodiment is different from the above individual embodiments in that interruption conditions for the successive printing jobs are changed in accordance with a degree of printing resolution of an image to be printed. That is, upon receipt of printing job data from an external device or the like (step S20), the printing operations performed on the respective printing media 2a to 2c, that is, the successive printing jobs, are started (step S21). Subsequently, it is determined whether or not all of the successive printing jobs executed for the respective printing media 2a to 2c have been completed (step S22). In the case where it has been determined that all of the successive printing jobs executed for the respective printing media 2a to 2c have been completed (Yes), the series of the printing operations are completed. In contrast, in the case where it has been determined that all of the successive printing jobs executed for the respective printing media 2a to 2c have not yet been completed (No), subsequently, it is determined whether or not a predetermined maintenance timing point has come (step S23). In the case where it has been determined that the maintenance timing point has not yet come (No), the process flow returns to step S21, and the printing operations are continued. In the case where it has been determined in step S23 that the maintenance timing point has come (Yes), for the successive printing jobs executed for the respective printing media 2a to 2c, it is determined whether or not mid-printing images includes at least one image having a degree of printing resolution higher than or equal to a first degree of printing resolution (step S24). In the case where the mid-printing images do not include the at least one image having the degree of printing resolution higher than or equal to the first degree of printing resolution, at least one printing job conducting printing of at least one image having a degree of resolution lower than the first degree of resolution is interrupted even at its midpoint, that is, at least one successive printing job (at least one third successive printing job) executing a printing job for an image having a second degree of resolution lower than the first degree of resolution is interrupted (step S25), and subsequently, the maintenance is executed (step S26). In contrast, in the case where, in step S24, it has been determined that, for the successive printing jobs executed for the respective printing media 2a to 2c, the mid-printing images includes the at least one image having the degree of printing resolution higher than or equal to the first degree of printing resolution, among at least one successive printing job including at least one printing job conducting printing of the at least one mid-printing image having the degree of printing resolution higher than or equal to the first degree of printing resolution, one successive printing job (one first successive printing job) including one first printing job that is conducting printing of one of the at least one mid-printing image (the first image) and that is to be completed first during a period starting from the determination time point is interrupted at a time point (a first time point) at which the first printing job, which is conducting printing of one of the at least one mid-printing image, has been completed (in step S27). In the case where, during a period after the interruption of the first successive printing job, for at least one remaining printing medium 2 (the second medium), there exists at least one second printing job conducting printing of at least one remaining image (the second image) among the at least one image having the degree of resolution higher than or equal to the first degree of resolution, at least one successive printing job (at least one second successive printing job) including the at least one second printing job is continued.

Next, it is determined whether or not, at the first time point at which the first successive printing job has been interrupted, there exists at least one image (at least one mid-printing image) being printed by at least one printing job executed for at least one remaining printing medium 2 (step S28). In the case where, at the first time point, there exists no image (no mid-printing image) being printed by the at least one printing job executed for the at least one remaining printing medium 2, the maintenance is executed (step S26). In contrast, in the case where, at the first time point, there exists the at least one image (the at least one mid-printing image) being printed by the at least one printing job executed for the at least one remaining printing medium 2, the processes of steps S24, S25, S27, and S28 are repeated.

Here, an image that is one of the images having the degree of resolution higher than or equal to the first degree of resolution and that has been printed by the firstly-interrupted successive printing job during a period from a time point at which it has been determined in step S23 that the maintenance timing point has come until a time point immediately before the interruption of the firstly-interrupted successive printing job is referred to as a first image, and corresponds to one image in the invention. Further, at least one image that has the degree of resolution higher than or equal to the first degree of resolution and that has been printed by at least one successive printing job, which has been interrupted during the repetition of the processes of steps S24, S25, S27 and S28, until a time point immediately before the interruption of the at least one successive printing job is referred to as at least one second image, and corresponds to at least one remaining image in the invention. Further, among at least one successive printing job executing a printing job for an image having the degree of printing resolution higher than or equal to the first degree of printing resolution when the it has been determined in step S23 that the maintenance timing point has come, the successive printing job having been interrupted first after the time point at which it has been determined in step S23 that the maintenance timing point has come is referred to as the first successive printing job, and thereafter, the at least one successive printing job having been interrupted during the repetition of the processes of steps S24 to S28 is referred to as the at least one second successive printing job. Moreover, a printing medium 2 corresponding to the first successive printing job corresponds to one medium (the first medium) in the invention, and at least one printing medium 2 corresponding to the at least one second successive printing job corresponds to at least one remaining medium (the second medium) in the invention. Further, at least one time point at which the at least one second successive printing job has been interrupted is referred to as at least one second time point. Further, at least one image having a degree of resolution lower than the first degree of resolution is referred to as at least one third image; at least one successive printing job that is interrupted in step S25 is referred to as at least one third successive printing job; at least one printing medium 2 corresponding to the at least one third successive printing job is referred to as at least one third medium. Note that the first degree of resolution is not limited to a middle degree of resolution, and an appropriate given degree of resolution can be selected.

An example in which the printing operation in the above flowchart is applied to the successive printing jobs illustrated in FIG. 5 will be described. In the case where a maintenance timing point has come slightly before the completion time point t1 of the printing job J1a included in the successive printing job executed for the first printing medium 2a, a successive printing job (the first successive printing job) executed for the printing medium 2a (the one medium and the first medium) is interrupted at the printing completion time point t1 (the first time point) of an image (the first image, the one image) corresponding to the printing job J1a, that is, an image corresponding to a printing job to be completed first, among images each having a degree of resolution higher than or equal to the first degree of resolution (for example, a degree of resolution obtained by performing printing of an image within a predetermined range using a printing head whose number of scanning operations (number of passes) is represented by "8 pass", namely, a middle degree of resolution). Here, successive printing jobs corresponding to the printing media 2b and 2c are continuously executed until the printing completion time point t1 of the printing job J1a. Next, a successive printing job (one of the at least one second successive printing job) corresponding to the printing medium 2b (one of the at least one remaining medium and the second medium) is interrupted at the printing completion time point t3 (one of the at least second time point) of an image (one of the at least one second image, one of the at least one remaining image) corresponding to the printing job Jib, that is, an image that is being printed at the printing completion point t1 of the image corresponding to the printing job J1a and that has a degree of resolution higher than the first degree of resolution. An image corresponding to the printing job J2c for the printing medium 2c and being printed at the printing completion time point t3 of an image corresponding to the printing job J1b for the printing medium 2b has a degree of resolution lower than the first degree of resolution (a degree of resolution obtained by performing printing of an image within a given range using a printing head whose number of scanning operations is represented by "4 pass", namely, a low degree of resolution), and thus, a successive printing job (one of the at least one third successive printing job) for the printing medium 2c is interrupted at the time point t3, that is, a midpoint of an image (one of the at least one third image) corresponding to the printing job J2c. In this way, the maintenance is executed at a time point at which all of the successive printing jobs each executed for a corresponding one of the printing media 2a to 2c have been interrupted.

In this way, in the present embodiment, upon coming of the timing point of the execution of the maintenance, in the case where at least one mid-printing image includes the first image, which has a relatively high degree of printing resolution higher than or equal to the first degree of resolution, after the completion of a printing job corresponding to the relevant first image, the individual successive printing jobs are interrupted and the maintenance is executed, and thus, it is possible to not only reduce the occurrence of the ejection failure, but also reduce the occurrence of a defect in which the evenness arises in an image for which higher image quality is required, and enhance the productivity for images having low image quality.

Note that, in the above individual embodiments, the configuration in which images are printed on the three printing media 2, but without being limited to this configuration, the invention can be also applied to a configuration in which images are printed on two printing media 2 or four or more printing media 2.

Further, in the above individual embodiments, the configuration in which all of the successive printing jobs executed for the respective printing media 2 are resumed after the execution of the maintenance, but without being limited to this configuration, the invention can be also applied to a configuration in which all of the successive printing jobs executed for the respective printing media 2 are not resumed after the execution of the maintenance. Furthermore, the invention can be also applied to a configuration in which at least one of the successive printing jobs executed for the respective printing media 2 is resumed after the execution of the maintenance. In other words, it is possible to not only reduce the occurrence of an ejection failure, but also reduce the occurrence of a defect in which evenness within the images having been printed before and after the execution of the maintenance arises as long as the maintenance is executed at a timing point at which printing jobs included in the successive printing jobs each executed for a corresponding one of the plurality of media have been completed.

The entire disclosure of Japanese Patent Application No. 2017-210107, filed Oct. 31, 2017 and the entire disclosure of Japanese Patent Application No. 2018-079631, filed Apr. 18, 2018 are expressly incorporated by reference herein.

What is claimed is:

1. A control method for a liquid ejecting apparatus including a transport mechanism configured to transport a first medium and a second medium in a transport direction in a state in which the first medium and the second medium are placed side by side, a printing head configured to eject liquid onto the first medium and the second medium while the printing head moves in directions intersecting with the transport direction so as to print a first plurality of images on the first medium and a second plurality of images on the second medium, at least one of the first plurality of images being different from at least one of the second plurality of images in a length in the transport direction, and a maintenance mechanism configured to execute maintenance for the printing head, the control method comprising:

executing a first series of successive printing jobs for printing a first plurality of images on the first medium in parallel and a second series of successive printing jobs for printing a second plurality of images on the second medium;

interrupting the first series of successive printing jobs after a completion of a first printing job for printing a first image included in the first series of successive printing jobs, and before a start of a next printing job for printing a next image following the first printing job included in the first series of successive printing jobs;

interrupting the second series of successive printing jobs after a completion of a printing job included in the second series of successive printing jobs and being under execution at a time point at which the first series of successive printing jobs has been interrupted; and executing, by the maintenance mechanism, a maintenance for the printing head in a state in which both the first series of successive printing jobs and the second series of successive printing jobs are interrupted.

2. The control method for the liquid ejecting apparatus, according to claim 1, the control method further comprising:

calculating, based on printing job data corresponding to each of the first medium and the second medium, time difference from the completion timing point of the one printing job for printing the first image on the first medium until at least one completion timing point of printing jobs executed for the second medium, and wherein the maintenance is executed in a state in which both the first series of successive printing jobs and the second series of successive printing job are interrupted in accordance with an interruption condition that allows the time difference to fall within a predetermined set range.

3. The control method for the liquid ejecting apparatus, according to claim 2, wherein the time difference is calculated based on completion timing points that are associated with printing jobs included in the first series of successive printing jobs and the second series of successive printing jobs and that falls within an allowable period that is an allowable range of a period within which the printing is successively executable without the execution of the maintenance, and the maintenance is executed in the state in which both the first series of successive printing jobs and the second series of successive printing jobs are interrupted in accordance with the interruption condition.

4. The control method for the liquid ejecting apparatus, according to claim 2, wherein the liquid ejecting apparatus further includes a detection mechanism configured to detect an ejection failure of the printing head, and wherein the time difference is calculated when the ejection failure of the printing head is detected by the detection mechanism, and the maintenance is executed in the state in which both the first series of successive printing jobs and the second series of successive printing jobs are interrupted in accordance with the interruption condition.

5. The control method for the liquid ejecting apparatus, according to claim 4, wherein the time difference is calculated within a predetermined period starting from the detection of the ejection failure of the printing head by the detection mechanism, and the maintenance is executed in the state in which both the first series of successive printing jobs and the second series of successive printing jobs are interrupted in accordance with the interruption condition.

6. The control method for the liquid ejecting apparatus, according to claim 1, the control method further comprising:

calculating, based on printing job data corresponding to each of the first medium and the second medium, time difference from the completion timing point of the one printing job for printing the first image on the first medium until at least one completion timing point of printing jobs executed for the second medium, and wherein the maintenance is executed in the state in which both the first series of successive printing jobs and the second series of successive printing job are interrupted in accordance with an interruption condition that minimizes the time difference.

7. The control method for the liquid ejecting apparatus, according to claim 6,
wherein the time difference is calculated based on completion timing points that are associated with printing jobs included in the first series of successive printing jobs and the second series of successive printing jobs and that falls within an allowable period that is an allowable range of a period within which the printing is successively executable without the execution of the maintenance, and the maintenance is executed in the state in which both the first series of successive printing jobs and the second series of successive printing jobs are interrupted in accordance with the interruption condition.

8. The control method for the liquid ejecting apparatus, according to claim 6,
wherein the liquid ejecting apparatus further includes a detection mechanism configured to detect an ejection failure of the printing head, and
wherein the time difference is calculated when the ejection failure of the printing head is detected by the detection mechanism, and the maintenance is executed in the state in which both the first series of successive printing jobs and the series of second successive printing jobs are interrupted in accordance with the interruption condition.

9. The control method for the liquid ejecting apparatus, according to claim 8, wherein the time difference is calculated within a predetermined period starting from the detection of the ejection failure of the printing head by the detection mechanism, and the maintenance is executed in the state in which both the first series of successive printing jobs and the series of second successive printing jobs are interrupted in accordance with the interruption condition.

10. The control method for the liquid ejecting apparatus, according to claim 1, the control method further comprising:
resuming at least one of the first series of successive printing jobs and the second series of successive printing jobs after the execution of the maintenance.

11. A control method for a liquid ejecting apparatus including a transport mechanism configured to transport a first medium and a second medium in a transport direction in a state in which the first medium and a second medium are placed side by side, a printing head configured to eject liquid onto the first medium and the second medium while the printing head moves in directions intersecting with the transport direction so as to print a plurality of images on the first medium and the second medium, at least one of the plurality of images being different from any other one of the plurality of images in a length in the transport direction, and a maintenance mechanism configured to execute maintenance for the printing head, the control method comprising:
executing a first series of successive printing jobs for printing a plurality of images on the first medium in parallel with a second series of successive printing jobs for printing a plurality of images on the second medium;
interrupting the first series of successive printing jobs after a completion of a printing job for printing a first image included in the first series of successive printing jobs, and before a start of another printing job for printing an image following the first image;
in a case where a mid-printing image by executing the second series of successive printing jobs at a first time point at which the first series of successive printing jobs has been interrupted is a second image having a degree of printing resolution higher than or equal to a degree of printing resolution of the first image, interrupting the second series of successive printing jobs at a second time point at which a printing job for printing the second image has been completed;
in a case where a mid-printing image by executing the second series of successive printing jobs at the first time point is a third image having a degree of printing resolution lower than the degree of printing resolution of the first image, interrupting the second series of successive printing jobs at a midpoint of execution of a printing job for printing of the third image; and
executing, by the maintenance mechanism, maintenance for the printing head in a state in which both the first series of successive printing jobs and the second series of successive printing jobs are interrupted.

12. The control method for the liquid ejecting apparatus, according to claim 11, the control method further comprising:
resuming at least one of the first series of successive printing jobs and the second series of successive printing jobs after the execution of the maintenance.

13. A control method for a liquid ejecting apparatus including a transport mechanism configured to transport a first medium and a second medium in a transport direction in a state in which the first medium and the second medium are placed side by side, a printing head configured to eject liquid onto the first medium and the second medium while the printing head moves in directions intersecting with the transport direction so as to print a first plurality of images on the first medium and a second plurality of images on the second medium, at least one of the first plurality of images being different from at least one of the second plurality of images in a length in the transport direction, and a maintenance mechanism configured to execute maintenance for the printing head, the control method comprising:
printing the first plurality of images in series on the first medium and a second plurality of images in series on the second medium in parallel;
interrupting the printing on the first medium after a completion of printing one of the first plurality of images, and before a start of printing another image following the one image included in the first plurality of images;
interrupting the printing on the second medium after a completion of printing one of the second plurality of images when the printing the first plurality of images has been interrupted; and
executing, by the maintenance mechanism, maintenance for the printing head in a state in which printing both the first plurality of images and the second plurality of images are interrupted.

\* \* \* \* \*